United States Patent
Bernhard et al.

(10) Patent No.: US 12,311,863 B2
(45) Date of Patent: May 27, 2025

(54) AIRBAG MODULE, METHOD FOR EXCHANGING A GAS GENERATOR OF AN AIRBAG MODULE, AND METHOD FOR PRODUCING AN AIRBAG MODULE

(71) Applicant: ZF AUTOMOTIVE GERMANY GMBH, Alfdorf (DE)

(72) Inventors: Kalus Bernhard, Spraitbach (DE); Marc Elstner, Mutlangen (DE); Werner Freisler, Schwäbisch Gmünd (DE); Nico Maier, Alfdorf (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/802,348

(22) PCT Filed: Feb. 23, 2021

(86) PCT No.: PCT/EP2021/054436
§ 371 (c)(1),
(2) Date: Aug. 25, 2022

(87) PCT Pub. No.: WO2021/170577
PCT Pub. Date: Sep. 2, 2021

(65) Prior Publication Data
US 2023/0150448 A1 May 18, 2023

(30) Foreign Application Priority Data
Feb. 26, 2020 (DE) .................... 10 2020 104 986.2

(51) Int. Cl.
*B60R 21/206* (2011.01)
*B60R 21/217* (2011.01)
(52) U.S. Cl.
CPC ........ *B60R 21/206* (2013.01); *B60R 21/2171* (2013.01)

(58) Field of Classification Search
CPC .......................... B60R 21/206; B60R 21/2171
See application file for complete search history.

(56) References Cited

U.S. PATENT DOCUMENTS

| 5,611,563 | A | * | 3/1997 | Olson | B60R 21/2171 280/741 |
| 6,837,513 | B2 | * | 1/2005 | Oka | B60R 21/2176 280/741 |

(Continued)

FOREIGN PATENT DOCUMENTS

| CN | 105377639 B | * | 6/2017 | .......... B60R 21/213 |
| DE | 69506966 T2 | | 5/1999 | |

(Continued)

OTHER PUBLICATIONS

PCT International Search Report for corresponding International Application Serial No. PCT/EP2021/054436, mailed Apr. 1, 2021, pp. 1-5.

*Primary Examiner* — Timothy Wilhelm
(74) *Attorney, Agent, or Firm* — Tarolli, Sundheim, Covell & Tummino LLP

(57) ABSTRACT

The invention describes an airbag module (10), specifically a knee airbag module, comprising at least a module housing (12), an airbag, specifically a knee airbag, and an inflator (16), as well as a holding element (14), the holding element (14) including a seat (18) for the inflator (16) and enclosing the inflator (16) at least partly, in particular in a cage-like manner, the holding element (14) including securing elements (20) at least for securing the holding element (14) and the airbag to the module housing (12), the holding element (14) and/or the module housing (12) comprising a fixing element (24) for fixing the inflator (16) in the holding element (14). The invention further describes a method for replacing an inflator (16) of an airbag module (10).

22 Claims, 10 Drawing Sheets

(56) References Cited

U.S. PATENT DOCUMENTS

| | | | | |
|---|---|---|---|---|
| 7,354,062 B2* | 4/2008 | Heigl | ................... | B60R 21/26 280/740 |
| 7,364,194 B2* | 4/2008 | Mabuchi | ............... | B60R 21/231 280/741 |
| 8,123,249 B2* | 2/2012 | Zischka | ............... | B60R 21/2171 280/736 |
| 8,684,399 B2* | 4/2014 | Honda | .................. | B60R 21/263 280/728.2 |
| 10,632,953 B2* | 4/2020 | Shigemura | ............ | B60R 21/206 |
| 10,696,263 B2* | 6/2020 | Shigemura | ............ | B60R 21/231 |
| 11,548,466 B2* | 1/2023 | Disam | .................. | B60R 21/262 |
| 2002/0180186 A1* | 12/2002 | Hesse | ................ | B60R 21/2171 280/741 |
| 2003/0120409 A1* | 6/2003 | Takimoto | ............. | B60R 21/206 701/45 |
| 2003/0141705 A1* | 7/2003 | Oka | .................... | B60R 21/2176 280/728.2 |
| 2004/0090049 A1* | 5/2004 | McCann | ............. | B60R 21/2171 280/736 |
| 2013/0341892 A1 | 12/2013 | Honda et al. | | |
| 2014/0062072 A1* | 3/2014 | Acker | ................... | B60R 21/261 280/740 |
| 2016/0068131 A1* | 3/2016 | Komatsu | ............... | B60R 21/233 280/730.1 |
| 2018/0272982 A1* | 9/2018 | Yamauchi | ............ | B60R 21/206 |
| 2018/0281732 A1 | 10/2018 | Shigemura | | |
| 2018/0281733 A1* | 10/2018 | Shigemura | ............ | B60R 21/206 |
| 2018/0281734 A1* | 10/2018 | Shigemura | ............ | B60R 21/2171 |
| 2018/0281735 A1* | 10/2018 | Shigemura | ............ | B60R 21/206 |
| 2021/0170984 A1* | 6/2021 | Mueller | ............. | B60R 21/264 |
| 2022/0324410 A1* | 10/2022 | Jung | ................... | B60R 21/2171 |

FOREIGN PATENT DOCUMENTS

| | | | |
|---|---|---|---|
| DE | 10153861 A1 | 6/2002 | |
| DE | 102015015547 A1 | 6/2017 | |
| DE | 102018106924 A1 | 10/2018 | |
| JP | 2003205814 A | 7/2003 | |
| JP | 2005263153 A | 9/2005 | |
| JP | 2005335522 A | 12/2005 | |
| JP | 2011201424 A | 10/2011 | |
| WO | WO-2012150005 A1 * | 11/2012 | ........... B60R 21/261 |

* cited by examiner

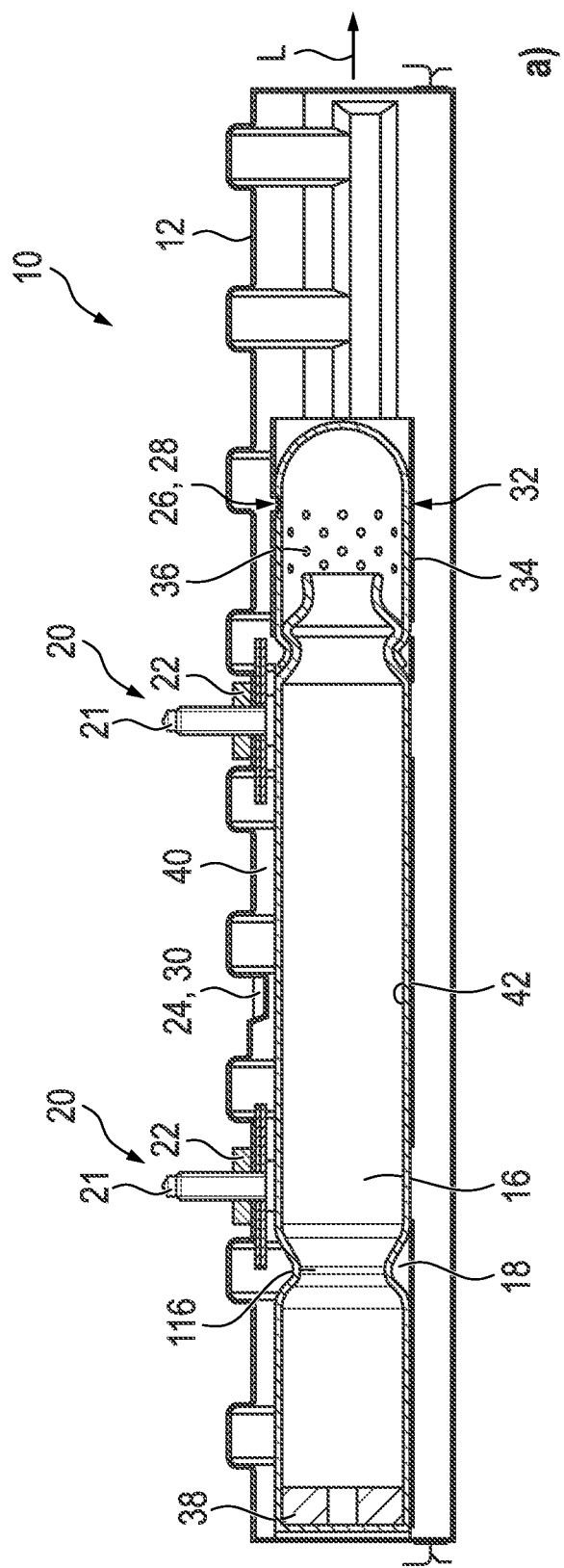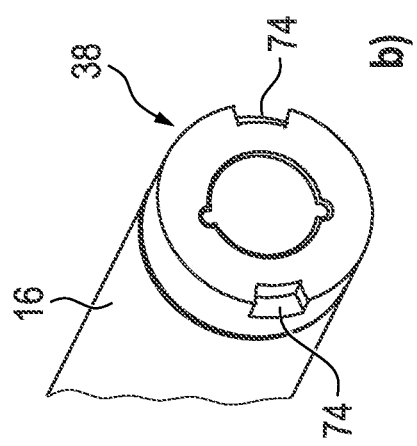
Fig. 1

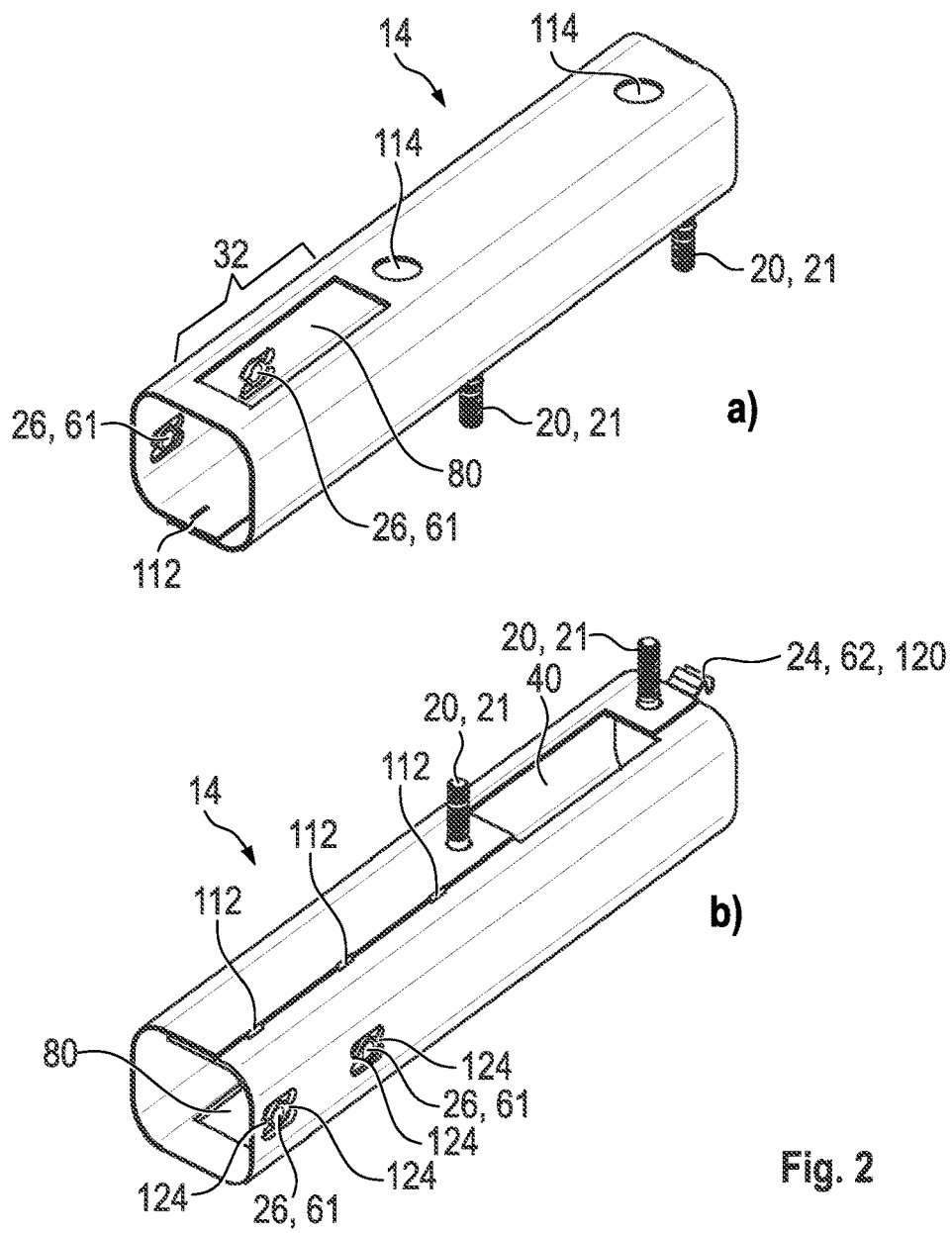
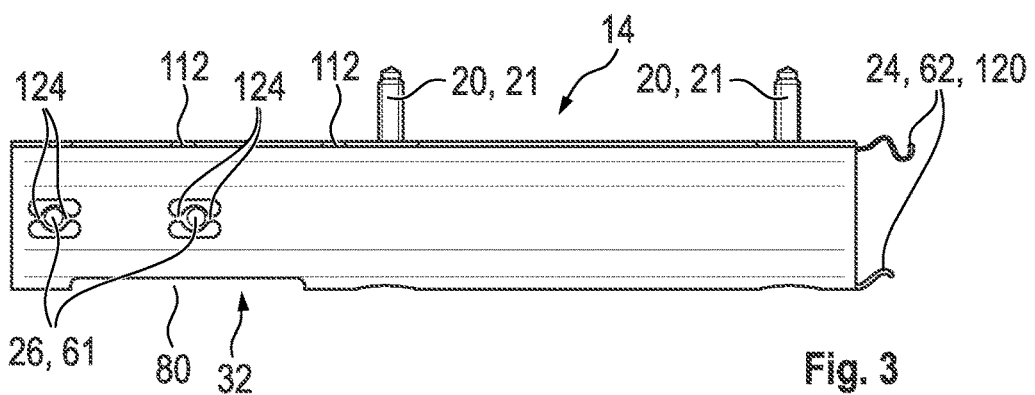

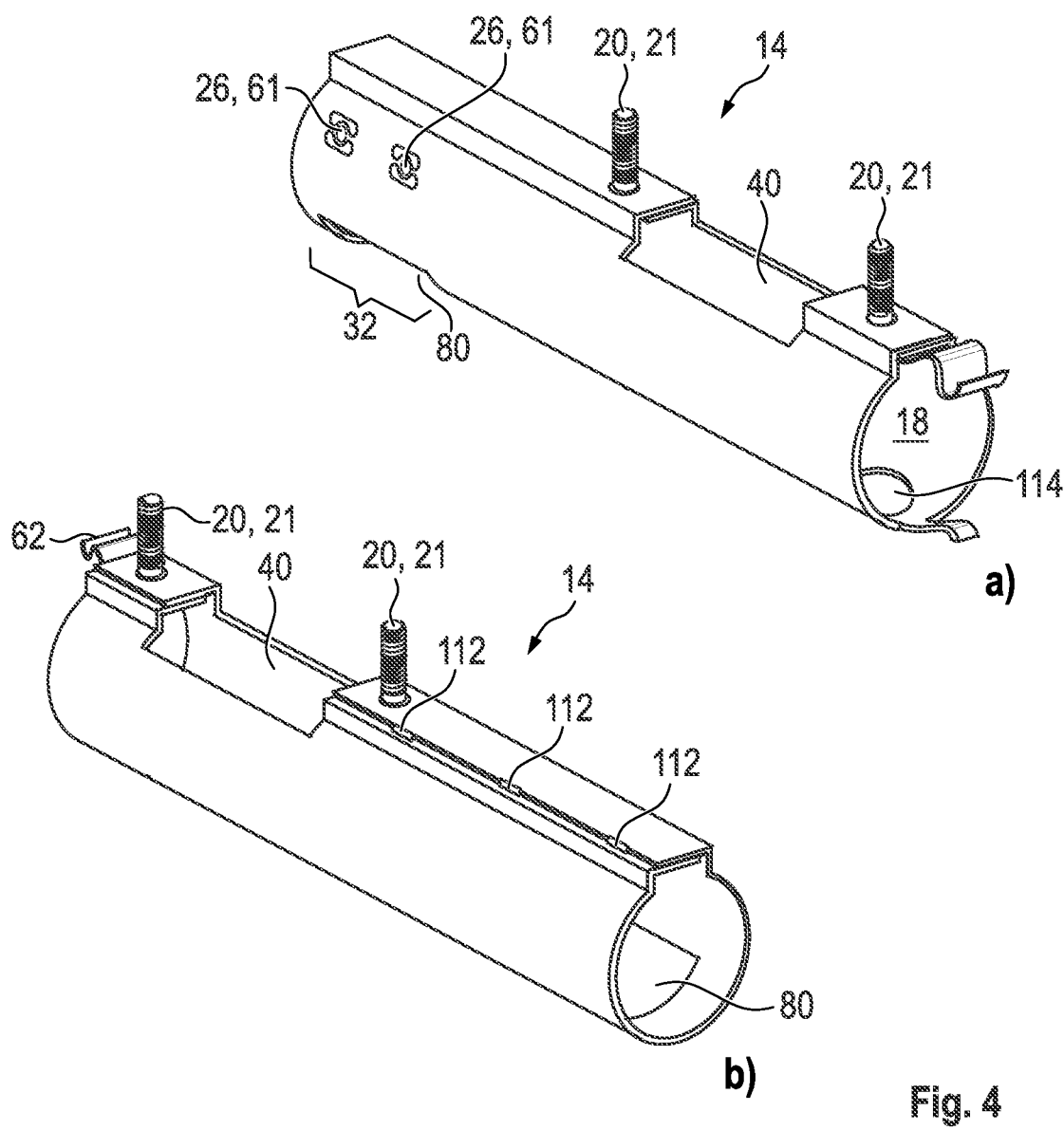
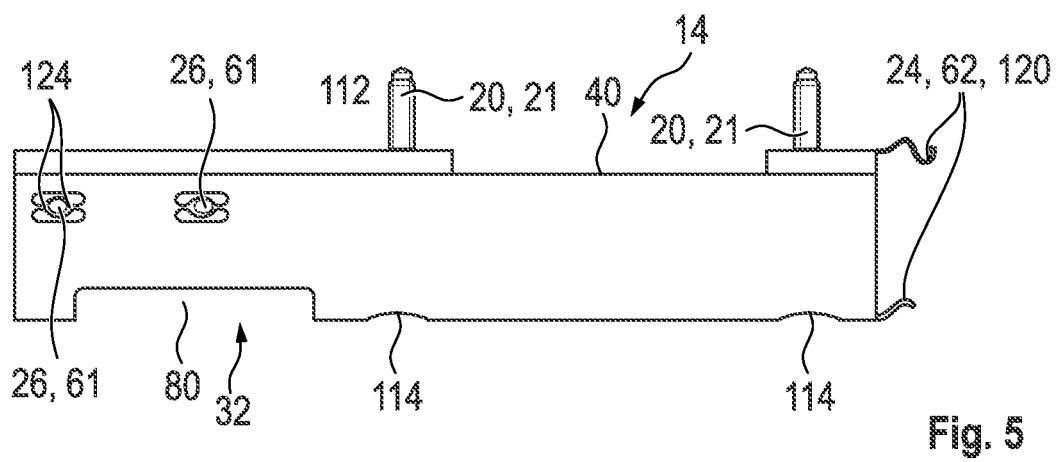
Fig. 4
Fig. 5

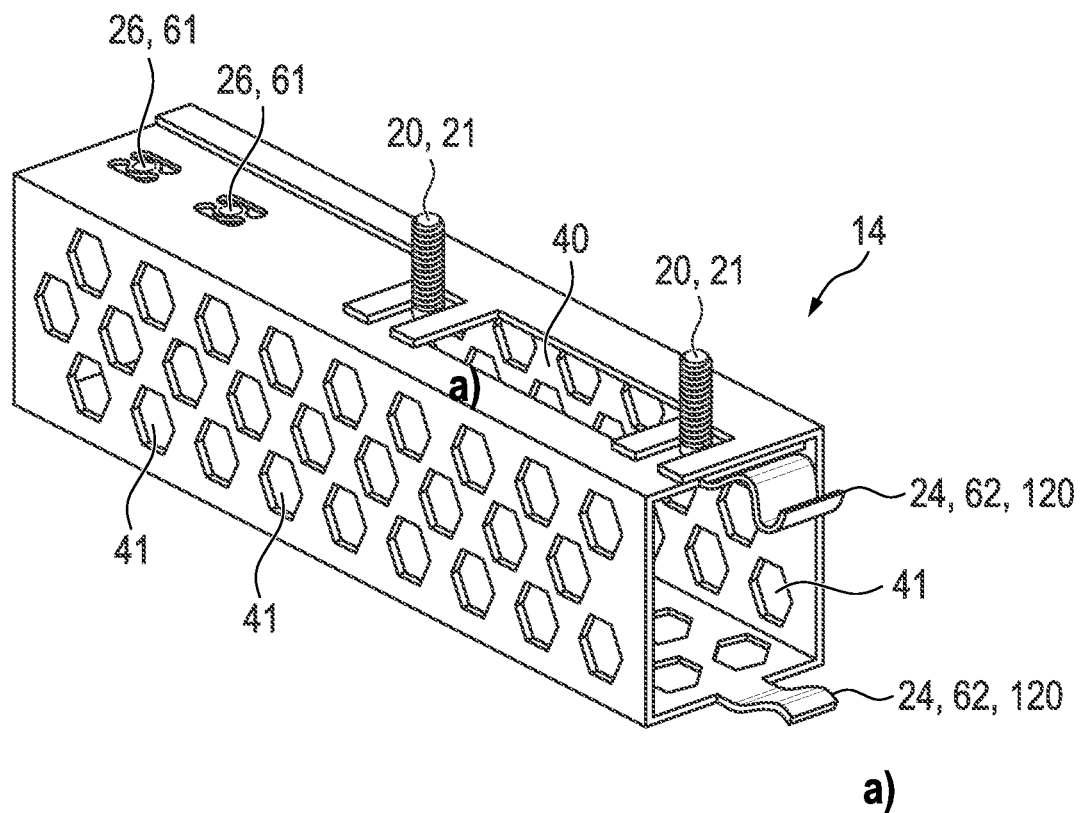
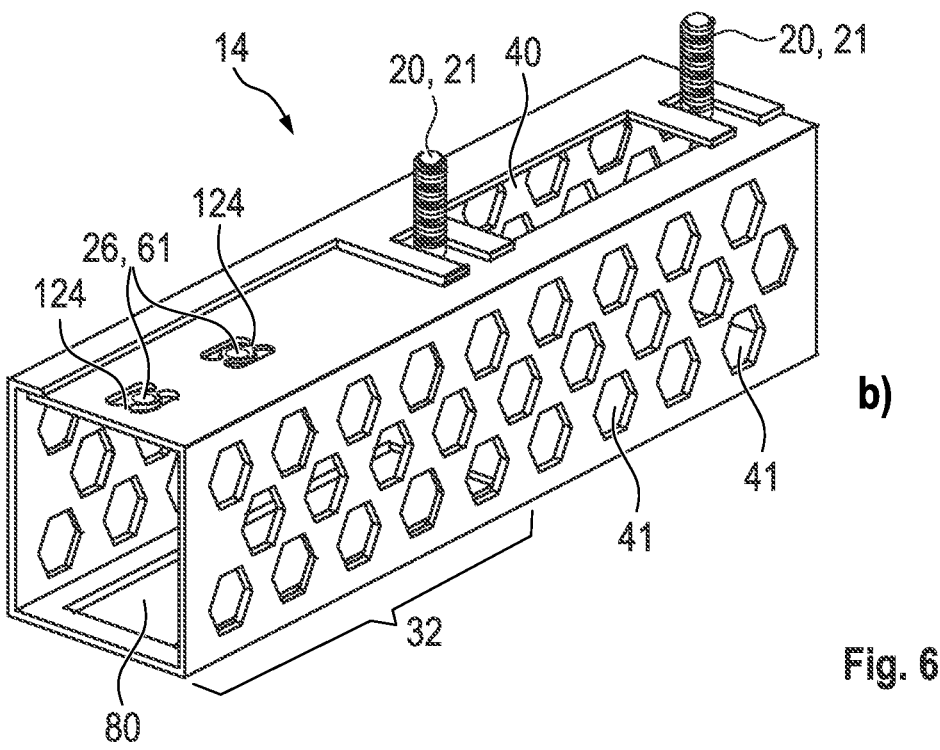
Fig. 6

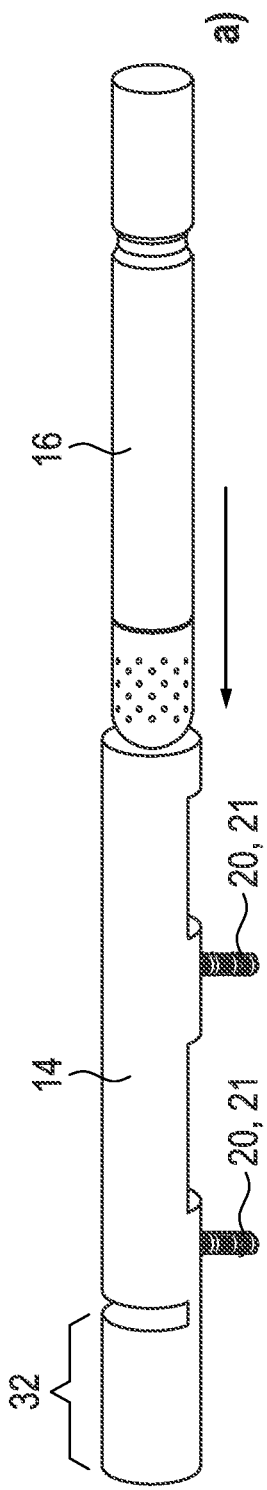
Fig. 19
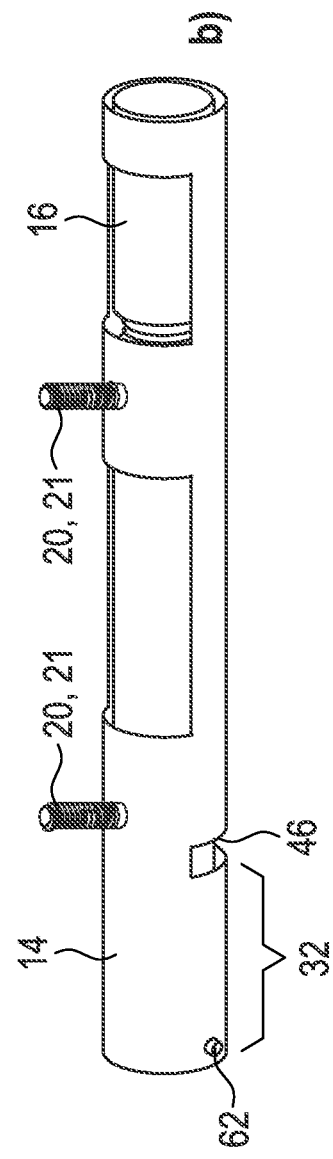
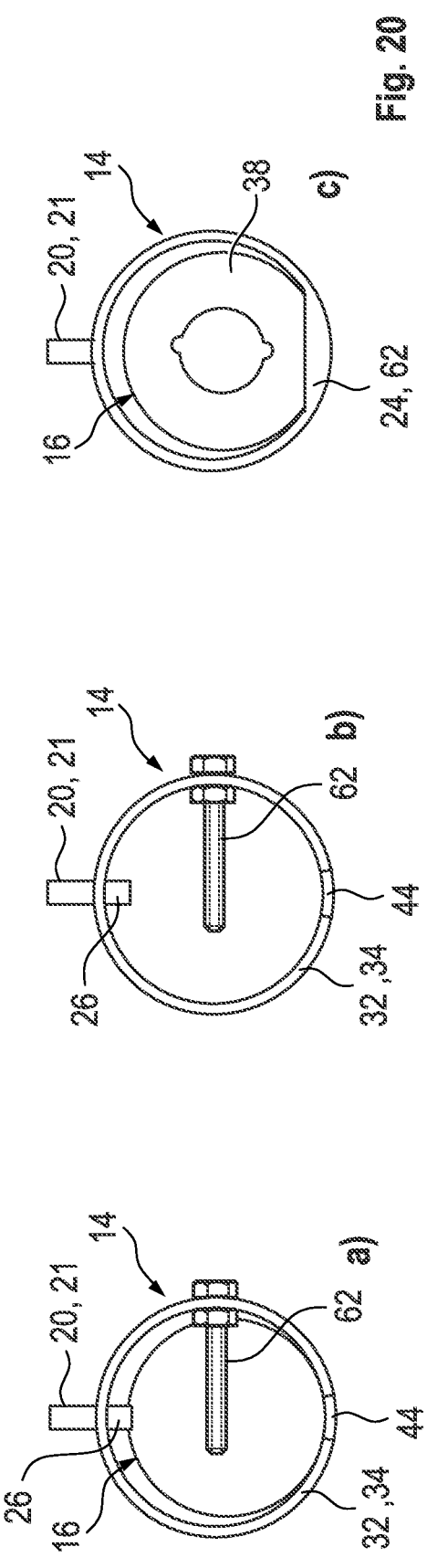
Fig. 20

AIRBAG MODULE, METHOD FOR EXCHANGING A GAS GENERATOR OF AN AIRBAG MODULE, AND METHOD FOR PRODUCING AN AIRBAG MODULE

RELATED APPLICATIONS

This application is a U.S. National Stage Application filed under 35 USC 371, claiming priority to Serial No. PCT/EP2021/054436, filed on 23 Feb. 2021; which claims priority from German Patent Application DE 10 2020 104 986.2, filed 26 Feb. 2020, the entireties of which are hereby incorporated herein by reference.

TECHNICAL FIELD

The invention relates to an airbag module according to the preamble of claim 1, a method for replacing an inflator of an airbag module according to the preamble of claim 15 and a method for manufacturing an airbag module according to claim 18.

BACKGROUND

In prior art airbag modules, the inflators of the airbag module are usually screwed with the module housing or specific retaining devices or are braced with clip collars. By arranging the inflator in the airbag, for example in a knee airbag, thermal fixation of the folded airbag package is possible, for example, within a limited temperature range only.

In addition, replacement of inflators is possible in prior art airbag modules with extreme effort only. In particular, in those airbag modules usually the entire airbag module must be dismantled and then assembled again, wherein frequently also the airbag folding is comprised. Moreover, concepts of airbag modules are known in which the connection between the inflator and the module housing cannot be dismantled in a nondestructive manner.

SUMMARY

It is the object of the invention to provide an airbag module that enables to easily remove and to easily replace the inflator without completely dismantling the airbag module.

It is a further object of the invention to provide a method for replacing an inflator of an airbag module of this type.

It is another object of the invention to provide an improved method for manufacturing an airbag module comprising a thermoset airbag package.
Achieving the Object The features according to claim 1 and the claims 15 and 18 result in achieving the object. Advantageous configurations are described in the subclaims.

An airbag module according to the invention comprises at least a module housing, an airbag and an inflator as well as a holding element that includes a seat for the inflator and at least partly encloses the inflator. The module housing may be made from metal or plastic. In addition, the module housing can be made at least partly from fabric or felt and can be configured as a fabric module housing. Further, in the present case also a module holder constituting an element of a fabric module housing, for example, is comprised by the term "module housing". Such a module holder can be made from metal or plastic, for example.

The holding element is particularly configured such that it encloses the inflator at least partly in a cage-like manner. Enclosing in a cage-like manner in this case is intended to describe that the holding element partly encloses the inflator in the installed state preferably at least in directions that are perpendicular to the longitudinal direction of the inflator. The holding element is preferably configured and disposed in or at the module housing in such a way that an inflator is allowed to be inserted/slid in from one side of the airbag module.

The holding element for the inflator further includes one securing element, preferably plural securing elements which are intended at least for securing the holding element and the inflator to the module housing. The holding element and/or the module housing further comprise(s) at least one fixing element for fixing the inflator in the holding element. Fixation of the inflator in the holding element can be carried out in particular by force and/or form closure.

The airbag module may be configured particularly as a knee airbag module and the airbag may be configured particularly as a knee airbag. The inflator of an airbag module according to the invention is preferably configured as a tubular inflator. Alternatively, the airbag module therefore can also be a side airbag module, a center airbag module, a curtain airbag module or a passenger airbag module. In addition, the airbag module can also be in the form of a rear occupant airbag module that can be disposed particularly in a front seat, or an overhead airbag module that is disposed in the roof area of the vehicle.

The module housing can be made, for example, from metal and/or plastic and/or can be at least partially a fabric housing. The securing elements can be in the form of securing bolts and securing nuts and/or of securing clips, for example, so that the holding element and the airbag can be secured to the module housing via the securing elements.

The holding element may consist of diverse materials such as steel, aluminum, magnesium, metal alloys and/or plastic and, accordingly, can be manufactured as a tube, a stamped and bent part, casting, deep-drawn part and/or injection molded part, for example.

In a preferred embodiment, the holding element comprises a positioning element and the inflator comprises a positioning element seat. As an alternative, the inflator can comprise the positioning element and the holding element can comprise the positioning element seat. The positioning element and the positioning element seat are designed to correspond to each other such that the inflator can be disposed at a predetermined position in the holding element.

The holding element may be provided to comprise plural positioning elements. This allows to receive inflators of different overall size in the holding element, for example. In this way, on the one hand, the same holding element can be used for different designed airbag modules. In addition, for example in developing or adapting the airbag module for a specific vehicle, a more powerful or a weaker inflator can be easily integrated in the airbag module, if this becomes necessary by changed or adjusted requirements.

In particular, by the predetermined position of the inflator in the holding element, a predetermined plug positioning of the plug member disposed on the inflator can be provided when the airbag module is installed in a vehicle. The inflator of the airbag module can be connected via the plug member, such as via an ignition cable, to a control unit of the vehicle, specifically to an airbag control device of the vehicle. Further, the positioning element and the positioning element seat serve, by positioning the inflator at a predetermined position in the holding element, as an anti-rotation protection that prevents the inflator from rotating in the holding element.

In order to retain the inflator at the predetermined position and to prevent the connection formed by the positioning element and the positioning element seat from being inadvertently released, the holding element can further comprise a positioning fixation device. The positioning fixation device can be, for example, a spring element or a pin element that prevents the inflator particularly from axially moving (along the longitudinal inflator axis) by maintaining the inflator at the predetermined position. Alternatively, the positioning element and/or the positioning fixation device can be generally configured so that it is/they are suited to fix the inflator at a predetermined position. For example, the positioning element and/or the positioning fixation device can also be in the form of a rivet or a screw element.

The positioning element(s) can be introduced into the holding element as a resilient dot embossing. Such a resilient dot embossing can be created, for example, in such a way that, when the holding element is manufactured in the punching and bending process, in a portion enclosing the dot embossing the material of the holding element is removed except for at least one spring arm. Preferably, the dot embossing in such embodiment remains connected to the holding element via at least two spring arms. In the finished state, the dot embossing is directed into the interior of the holding element and corresponds to a positioning element seat of the inflator which may be in the form of a funnel-shaped imprint in the inflator, for example. Alternatively, instead of the dot embossing, also a differently shaped protrusion being directed into the interior of the holding element can constitute the positioning element, such as a weld bead arranged in the area of the spring arm.

In another embodiment, the positioning element and the positioning element seat can be in the form of a bayonet lock, the positioning element being preferably configured as a bulge and the positioning element seat being preferably configured as an indentation.

The positioning element preferably is configured, in such embodiment, as an elevation directed into the interior of the holding element. For example, the positioning element can be in the form of a dot embossing in the holding element which is preferably introduced in a portion of the holding element enclosing the discharge area of the inflator.

The positioning element seat in this embodiment is preferably a groove disposed in the inflator. The groove of the positioning element seat is preferably introduced into the discharge area of the inflator. In order to obtain sufficient anti-rotation protection, the groove has a first leg and a second leg which are preferably aligned with each other in V-shape, the leg tail of the first leg and the leg head of the second leg forming the tip of the V-shape. The groove of the first leg is formed at the leg head in a preferably widened form and tapers toward the tip of the V-shape so that the finding and insertion of the positioning element configured as a bulge is facilitated. The leg tail of the second leg helps determine, in such embodiment, the latching position in which the inflator is in the predetermined position.

In order to maintain the inflator in the predetermined position and to prevent the bayonet lock formed by the positioning element and the positioning element seat from being inadvertently released, the holding element can further comprise a positioning fixation device. The positioning fixation device can be, for example, a spring element or a pin element that prevents the inflator from axially moving (along the longitudinal inflator axis) by maintaining the inflator relative to the holding element at the latching position and, thus, at the predetermined position.

In an alternative embodiment, the positioning element is configured as a wedge-shaped bulge, in particular as a wedge-shaped notch, and the positioning element seat is configured as an indentation corresponding to the wedge-shaped bulge, in particular as a wedge-shaped groove.

The positioning element in the form of a wedge-shaped notch in such embodiment is preferably formed in the holding element and preferably extends along the longitudinal axis in a portion of the holding element which encloses the discharge area of the inflator. The wedge-shaped notch is preferably in the form of a bulge facing the interior of the holding element. The groove formed corresponding to the wedge-shaped notch preferably is introduced as a wedge-shaped longitudinal groove into the inflator, particularly into the discharge area of the inflator. By configuring the positioning element as wedge-shaped longitudinal notch and the positioning element seat as corresponding wedge-shaped groove, a twist-proof positioning of the inflator can be obtained in the holding element. In addition, the holding element can comprise, also in this embodiment, a positioning fixation device that prevents the inflator from being displaced in the axial direction in the holding element. The positioning fixation device can be in the form of a spring element disposed at the end of the holding element which encloses the plug member of the inflator so that the spring element helps the inflator press toward the portion of the holding element enclosing the discharge area. As an alternative, the positioning fixation device can be in the form of a screw or plug-in element that is adapted to be screwed or attached to the end of the holding element enclosing the plug member of the inflator and, thus, presses the inflator toward the portion of the holding element enclosing the discharge area.

In a preferred embodiment, the fixing element for fixing the inflator in the holding element is configured as a recess directed into a housing interior of the module housing. For example, the recess is configured as a bead introduced to the module housing.

The recess directed into the module housing is located in the module housing in an area where the holding element is disposed with the inflator. The fixing element in the form of a recess is configured such that, when the securing elements by which the holding element and the airbag are secured to the module housing are fastened, it engages in a dedicated opening of the holding element and forces the inflator against an inner wall of the holding element and, thus, fixes the inflator in the holding element. The recess formed as a recess in the module housing effectuates simple fixation of the inflator in the holding element which moreover prevents noise caused by vibrations of the inflator in the holding element in a simple manner.

In an alternative embodiment, the fixing element for fixing the inflator is disposed in or on the module housing such that, when the holding element is fastened, the fixing element engages in an inflator neck portion of the inflator, thereby positively fastening the inflator in the holding element. For example, the fixing element can be configured, in such embodiment, as a, particularly bent, pin element which is disposed in the housing interior of the module housing.

In another alternative embodiment, the fixing element can be formed integrally with a positioning fixation device, in particular as a spring element. For this purpose, the spring element can have a latching area, for example, that is adapted to engage in an inflator neck portion to thereby prevent or restrict an axial movement. Preferably, the module housing in such embodiment also comprises a fixing element.

Such a positioning fixation device can help fix the inflator in the holding element, particularly already before the holding element with the inflator is secured to the airbag module housing and/or to the vehicle structure, thereby allowing to further facilitate the installation of an airbag module according to the invention.

In another alternative embodiment, the fixing element comprises, for fixing the inflator in the holding element, also a spring element that is preferably operatively connected to a bracing device.

In such embodiment, the spring element may be wave-shaped, the bracing device being preferably operatively connected to a wave crest of the wave-shaped spring element. The bracing device has, for example, a bolt or any other screw member that can be utilized to brace the spring element against the inflator to thereby non-positively fix the inflator in the holding element. In one embodiment, the bracing device can be provided to be released via an opening provided in the module housing without releasing the securing elements of the holding element so as to release the non-positive connection between the inflator and the holding element and to remove the inflator.

Alternatively, such a fixing element configured as spring element can be provided to be disposed in the holding element in such a way that, by fastening the securing elements and, thus, securing the holding element and the airbag to the module housing, the inflator is fixed non-positively by the spring element in the holding element.

In another alternative embodiment, the fixing element is configured as a latching seat disposed in the holding element. The latching seat is formed to receive a latching element disposed on the inflator. The latching element formed on the inflator is, for example, a spring system the spring elements of which are configured so that they can engage in the latching seats to thereby allow the inflator to be latched in a fixed position inside the holding element.

In another embodiment, the holding element can comprise a female thread specifically constituting the fixing element that corresponds to a male thread disposed on the inflator.

In such embodiment, the holding element can be, for example, in the form of a cage-like tube having a portion that includes a female thread, or in the form of an airbag nut that is sewn into the airbag of the airbag module particularly in the area of the inflation mouth. The male thread can be introduced or integrated, for example, directly in an outer cover of the inflator or can be formed on an inflator nut which is secured specifically adhesively to the inflator.

In a further embodiment, the fixing element comprises a fixing bolt which is preferably disposed in a fixing bolt seat on the holding element and/or the module housing. For fixing the inflator in the holding element, the fixing bolt can engage in a fixing bolt seat disposed on and/or in the inflator.

Further, the holding element may comprise a diffusor for the inflator which, when the inflator is activated, serves for directing the gas flow leaving the discharge area of the inflator and, moreover, can prevent the gas flow from directly flowing toward the fabric of the airbag in the discharge area. The diffusor of the holding element has an outer wall which encloses the inflator in the discharge area at least partially in the circumferential direction. The outer wall of the diffusor of the holding element has an interruption edge extending substantially in the longitudinal direction and, when the inflator is activated, is bent open along said interruption edge. The discharge direction for the gas flowing out of the inflator is defined by the bent-open outer wall of the diffusor. In addition, the bent-open outer wall of the diffusor is capable of protecting the fabric of the airbag.

Alternatively, the diffusor can be configured in the holding element as a diffusor opening. Accordingly, the discharge direction of the gas flowing out of the inflator is substantially defined by the diffusor opening.

The holding element can further comprise anti-bending devices in the area of the diffusor. The anti-bending devices can be designed, for example, so that latching lugs are bent by about 90° and engage in corresponding slits in the holding element. The anti-bending devices can particularly prevent the holding element in the form of a punched and bent part from being inadvertently bent open in the area of the diffusor when the airbag module is activated. In this way, the gas of the inflator can be achieved to flow off substantially through the diffusor opening.

In order to facilitate removal of the inflator from the holding element of the airbag module, the inflator can additionally comprise a removing aid which is preferably disposed in the area of the plug member of the inflator.

The object of the invention is further achieved by a method for replacing an inflator of an airbag module, the airbag module being particularly an afore-described airbag module according to the invention. The method comprises at least the following steps.

Initially, the securing elements are released so that the securing of the holding element and the airbag is released or at least loosened from the module housing so that the direct and/or indirect fixation of the inflator via the securing elements in the holding element is released. Direct fixation in this context describes that the securing element and the fixing element are in direct operational connection. Indirect fixation describes, on the other hand, that the securing element and the fixing element are indirectly operatively connected.

As an alternative, it can be provided that for releasing the fixation of the inflator in the holding element additionally or only the fixing element must be released so as to release the fixation of the inflator in the holding element.

The question whether only the securing elements or the fixing element or both the securing elements and the fixing element must be released is dependent on the embodiment of the airbag module.

In the further method steps, at first the old inflator is removed from the holding element in the module housing, before a new inflator is inserted into the holding element. Removing the old inflator and inserting the new inflator can be carried out, for example, with the aid of pliers corresponding to the removing aid of the inflator.

When the new inflator has been inserted into the holding element, the securing elements are fastened so as to fasten and secure the holding element and the inflator on the module housing again and to fix the inflator directly and/or indirectly in the holding element by fastening the securing elements.

Alternatively, for fixing the inflator in the holding element, additionally or only the fixing element can be provided to be fastened/fixed to effectuate the fixation of the inflator in the holding element.

The question whether only the securing elements or the fixing element or both the securing elements and the fixing element must be fastened/fixed is dependent on the embodiment of the airbag module.

In one embodiment of the method, the inflator is braced and thus fixed in the holding element, when fastening the securing elements, by a fixing element disposed on the module housing and/or integrated in the module housing. This may be the case, for example, if the fixing element is formed as a recess facing the housing interior in the module housing. This is an indirect fixation in which the securing element and the fixing element are indirectly operatively connected.

In an alternative embodiment of the method, the inflator is fixed in the holding element by a fixing element disposed on/in the holding element or corresponding to the holding element, wherein the fixation can be carried out in a separate method step or by interaction when fastening the securing elements.

The object of the invention is further achieved by a method for manufacturing an airbag module, the airbag module comprising at least a module housing, an airbag, an inflator and a holding element for the inflator. The airbag module is specifically an afore-described airbag module according to the invention. In particular, the airbag module may be a knee airbag module, a side airbag module or a center airbag module.

The method comprises at least the following steps.

At first the holding element is inserted into the unfolded airbag and subsequently the airbag is folded so that an airbag package is created. As an alternative to this, at first the holding element can be inserted into the folded airbag to create the airbag package. Further, the holding element can be provided to be inserted into a partly folded airbag and subsequently the airbag can be provided to be completely folded to create the airbag package.

In the next method step, the afore-created airbag package is thermoset.

During thermosetting, the airbag package is heated, specifically to a temperature of more than 90° C. The temperature to which the airbag package is heated is in particular higher than a maximum admissible thermosetting temperature of the inflator of the airbag module. The maximum admissible thermosetting temperature of the inflator usually depends on a safety ignition temperature at which the inflator must trip in a controlled manner.

Subsequently, the heated airbag package is compressed and cools down under the pressure. By the heating of the airbag after folding and the subsequent cooling of the folded airbag under pressure, the folding of the airbag is maintained without fixation being required.

When the thermoset airbag package is cooled, it can be inserted into the module housing of the airbag module. As a matter of course, the airbag package need not be inserted into the module housing immediately after cooling, but for the time being the thermoset airbag package can also be intermediately stored.

Finally, the inflator, which in a typical embodiment is a tubular inflator, is inserted into the holding element and is fastened in the holding element. Insertion and fastening of the inflator can be carried out both during manufacture of the airbag module and as late as directly during installation of the airbag module in the vehicle. Due to the insertion and the fastening of the inflator not before the airbag module is installed in the vehicle, the inflator and the airbag module which does not yet comprise an inflator can be dispatched separately from each other to the car manufacturer.

BRIEF DESCRIPTION OF FIGURES

Further advantages, features and details of the invention will be evident from the following description of an embodiment not to be understood in a restricting manner as well as based on the drawings, wherein:

FIG. 1 a) shows a schematic sectional view across a first embodiment of an airbag module according to the invention and b) shows a perspective detail view of a plug element of the inflator of the airbag module, FIGS. 2 a) and b) show perspective views of a first embodiment of a holding element of an airbag module according to the invention, FIG. 3 shows a perspective side view of the holding element according to FIG. 2, FIGS. 4 a) and b) show perspective views of a second embodiment of a holding element of an airbag module according to the invention, FIG. 5 shows a perspective side view of the holding element according to FIG. 4, FIGS. 6 a) and b) show perspective views of a third embodiment of a holding element of an airbag module according to the invention.

DESCRIPTION

Figure 7:
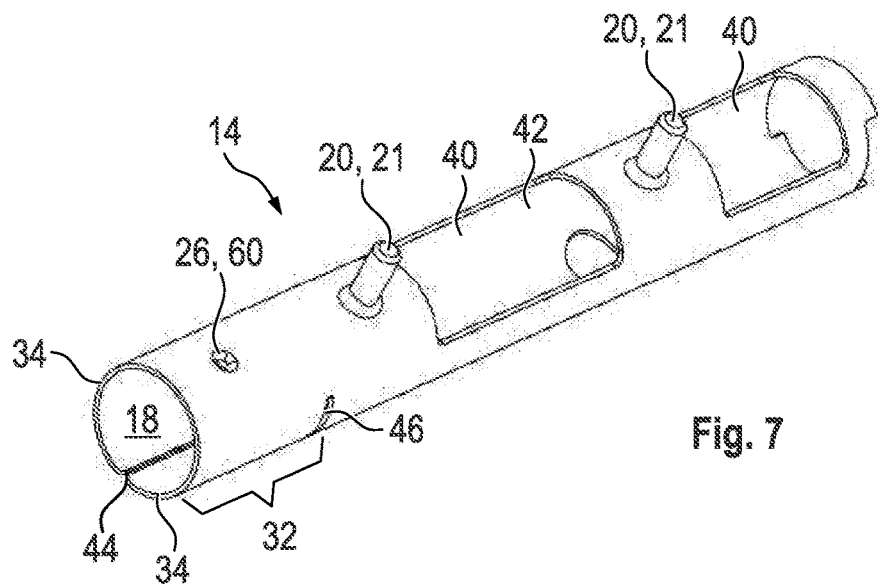
FIG. 7 shows a perspective view of a fourth embodiment of a holding element of an airbag module according to the invention.

FIG. 1 illustrates a sectional view across an embodiment of an airbag module 10 according to the invention. The airbag module 10 comprises at least a module housing 12, a holding element 14, an inflator 16 and an airbag the representation of which was renounced for reasons of clarity.

The holding element 14 comprises a seat 18 for the inflator 16 which encloses the inflator 16 at least partly in a cage-like manner. Further, the holding element 16 comprises securing elements 20, in this case securing bolts 21 and securing nuts 22 via which at least the holding element 14 and the airbag can be secured to the module housing 12. Via the securing elements 20 to 22, furthermore the airbag module 10 can be arranged in a vehicle, for example as a knee airbag module in a lower area of the dashboard.

In the shown embodiment, the holding element 14 comprises a positioning element 26 and the inflator 16 comprises a positioning element seat 28 by which the inflator 16 can be positioned at a predetermined position in the holding element 14.

The positioning element 26 is disposed on the holding element in the area of the diffusor 32. The positioning element seat 28 is disposed in the inflator 16 in the discharge area 36. The inflator 16 comprises, on the end opposite to the discharge area 36 in the longitudinal direction L, a plug element 38 via which the inflator 16 of the airbag module 10 can be connected, e.g., via a control and/or ignition line, to a control unit of the vehicle, specifically an airbag control device of the vehicle. In the area of the plug element 38, the inflator 16 in the shown embodiment has a removing aid 74 on which the inflator 16 can be gripped via pliers, for example, particularly when it is removed from the holding element 14 or when it is inserted into the holding element 14.

The module housing 12 comprises a fixing element 24 by which the inflator can be fixed in the holding element 14. The fixing element 14 in the form of a recess 30, in this case a bead 30, engages in an opening 40 of the holding element 14, when the holding element 14 is fastened to the module housing 12 via the securing elements 20 to 22, and forces the inflator 16 against an inner wall 42 of the holding element 14. In this way, the inflator 16 is fixed in the holding element 14. In addition, via said non-positive fixation, noise caused by vibrations of the inflator 16 in the holding element 14 can be easily prevented.

In the airbag module 10 according to the invention of FIG. 1, for replacing the inflator 16 it is not necessary to dismantle the whole airbag module 10. In order to replace the inflator 16, at first only the securing elements 20 to 22 are loosened so far that the inflator 16 is no longer forced against the inner wall 42 of the holding element by the bead 30 of the module housing 12. Subsequently, the inflator 16 to be replaced can be removed from the holding element 14 via the removing aids 74 and a new inflator 16 can be inserted. Then, the securing elements 20 to 22 are fastened again, causing the bead 30 of the module housing to force the new inflator 16 against the inner wall 42 of the holding element 14 and to thus fix the inflator 16 in the holding element 14.

It is another advantage of the airbag module 10 according to the invention as illustrated in FIG. 1 that the holding element 14 acts as a placeholder for the inflator 16, when the airbag module is manufactured, and in this way the inflator 16 can be inserted, for example, as late as at the end of the manufacturing process. This allows in particular that the airbag package consisting of the folded airbag and the holding element 14 can be fixed in a thermosetting process by heating and subsequent cooling under pressure, without a maximum admissible thermosetting temperature of the inflator 16 having to be considered.

FIGS. 2 and 3 illustrate a first embodiment of the holding element 14 that is manufactured as a punched and bent part and has a substantially square cross-section with rounded corner regions. The holding element 14 comprises securing elements 20 configured as securing bolts 21 which are press-fitted into the holding element 14, for example. In order to be able to press-fit the securing elements 20 into the holding element 14 after the punching and bending process, the holding element 14 includes installation openings 114. Alternatively, the securing elements 20 can be secured to the holding element 14 also by other manufacturing methods, such as by welding, as a matter of course.

The holding element 14 further has an opening 40 in which a fixing element 24, 30 of the module housing 12 (see FIG. 1) can engage, for example. Moreover, the weight of the holding element 14 can be reduced by the opening 40. The holding element 14 further comprises a diffusor 32 for the inflator 16 which is formed in the holding element of FIGS. 2 and 3 as diffusor opening 80.

The holding element 14 comprises two positioning elements 26 in the area of the diffusor 32. The positioning elements 26 are configured in this case as resilient dot embossings 61 facing the interior of the holding element. This allows to insert two different configurations of an inflator 16, in particular two inflators of different performance levels, into the holding element. The resilient dot embossing 61 can be produced in the punching and bending process by the fact that the material of the holding element is removed or, resp., punched out in the region around the dot embossing except the two spring arms 124. As an alternative to the dot embossing 61 facing the interior of the holding element, a protrusion of any design facing the interior of the holding element can be disposed on/in the holding element 14, such as in the form of a material thickening in the region of the spring arms 124, for example a weld bead disposed in the region of the spring arms (not shown).

The holding element 14 comprises, at the end opposite to the diffusor 32, a first embodiment of additional positioning fixation devices 62 which are in the form of resilient clip elements. The positioning fixation devices 62 are provided especially for fixing the inflator 16 in the holding element 14, before the holding element 14 and the inflator 16 are secured in the module housing or to the vehicle structure via the securing elements 20. To this end, the positioning fixation devices 62 shown here are formed integrally with fixing elements 24 as a spring element 120.

In the shown embodiment, the inflator 16 is pre-fixed in the holding element 14, after being inserted into the seat 18 of the holding element 14, at least by the positioning fixation device 62 opposite to the securing elements 20. By the positioning fixation device 62 disposed on the holding element 14 on the side of the securing elements 20, the pre-fixation can be additionally intensified. Moreover, the inflator 16 can be forced, when the holding element 14 and the inflator 16 are fastened to the module housing 12, against the side of the holding element 14 opposite to the securing elements 20 by the positioning fixation device 62 disposed on the holding element 14 on the side of the securing elements 20 and thus can be additionally fixed at least non-positively in the holding element 14 within the airbag module 10.

The positioning fixation device 62 disposed on the holding element 14 on the side of the securing elements 20 can be formed integrally with the holding element 14 or can be disposed on the holding element as a separate component in the manufacturing process.

The securing element 62 disposed on the side of the holding element 14 opposite to the securing elements 20 moreover acts as an additional fixing element 24 to fix the inflator 16 in the holding element 14, when the holding element 14 and the inflator 16 are fastened in the module housing 12 via the securing elements 20.

The holding element 14 further comprises anti-bending devices 112 in the area of the diffusor 32. The anti-bending devices 112 are designed such that latching lugs are bent by 90° and engage in corresponding slits. They can prevent the holding element 14 formed as a punched and bent part from inadvertently bending open when the airbag module 10 is activated so that the gas of the inflator 16 substantially flows off through the diffusor opening 80.

FIGS. 4 and 5 show a second embodiment of the holding element 14. As the second embodiment is largely similar to the above-described first embodiment and the elements exhibit the same characteristics, hereinafter substantially the differences of the embodiments will be illustrated. For the parts known from the first embodiment the same reference symbols are used. In this respect, the foregoing explanations are referred to.

The holding element 14 is equally manufactured as a punched and bent part and has a substantially circular cross-section, the cross-section having a bulge in the area in which the securing elements 20 are disposed.

Further, the diffusor opening 80 of the diffusor is configured to be larger compared to the holding element 14 of the FIGS. 2 and 3. FIG. 6 illustrates a third embodiment of the holding element 14 in which for already known elements again the same reference symbols are used and the foregoing explanations are referred to.

The holding element 14 of FIG. 6 is likewise configured as a punched and bent part but, in contrast to the foregoing embodiments, has no installation openings for the securing elements 20 configured as securing bolts 21, as they were arranged on the holding element 14 already before the punching and bending process, such as by press-fitting or by welding.

The holding element 14 has a substantially square cross-section. In contrast to the holding element 14 according to the first embodiment, the positioning elements 26 are disposed on the sidewall opposite to the diffusor opening in the holding element 14 rather than in one of the sidewalls adjacent to the diffusor opening 80. In addition, the holding element 14 has, apart from the opening 40 in which a fixing element 24 of the module housing 12 can engage, further openings 41 which substantially serve for optimizing the weight of the holding element 14. The openings 41 in the area of the diffusor 32 can further allow for an additional lateral gas outlet, when the airbag module 10 and, thus, the inflator is activated.

Figure 8:
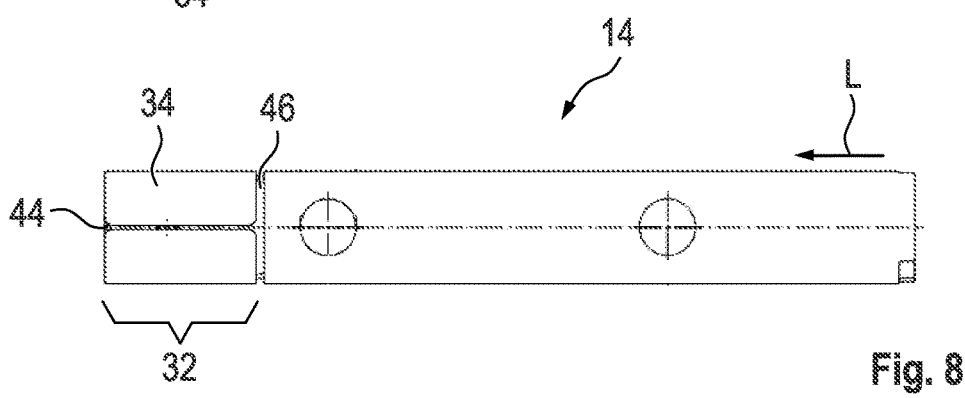
FIG. 8 shows a bottom view of the holding element according to FIG. 7.

FIGS. 7 and 8 show a fourth embodiment of the holding element 14 which is manufactured as a tube. The holding element 14 comprises securing elements 20 in the form of securing bolts 21 which are welded to the holding element 14 or are press-fitted in the holding element 14, for example. Further, openings 40 are shown by which the weight of the holding element 14 is reduced and in which a fixing element 24, 30 of the module housing 12 (see FIG. 1) can engage.

Figure 10:
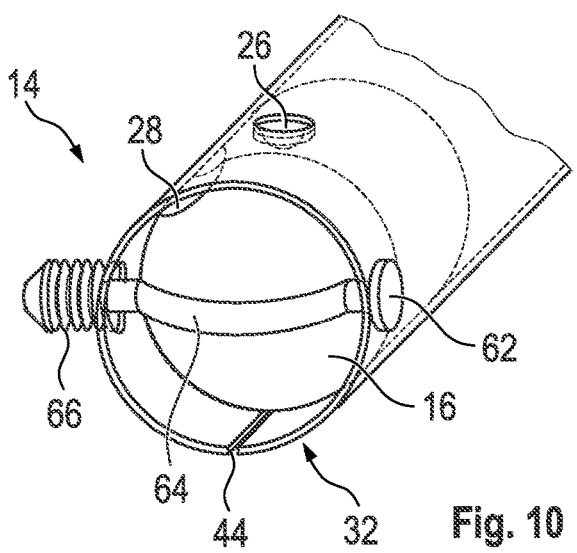
FIG. 10 shows a perspective view of a diffusor of the holding element according to FIG. 7 which comprises a first embodiment of an addition position fixation device.

The holding element 14 comprises a diffusor 32 for the inflator 16 including an outer wall 34 which encloses the inflator 16 at least partially in a discharge area 36 of the inflator 16 in the circumferential direction (see FIG. 10). The outer wall 34 of the diffusor 32 has an interruption edge 44 extending substantially in the longitudinal direction L. When the inflator 16 is activated, the outer wall 34 is bent open along said interruption edge 44, allowing an outflow direction for the gas and, resp., the gas flow to be defined. In order to enable such bending open and to restrict the expansion of the diffusor along the longitudinal direction L, an interruption 46 is introduced to the holding element 14, which interruption 46 may be a predetermined breaking point in further embodiments (not shown).

In the area of the diffusor 32 of the holding element 14, the positioning element 26 is introduced as a bulge facing the interior of the holding element, in this case as a dot embossing 60.

Figure 9:
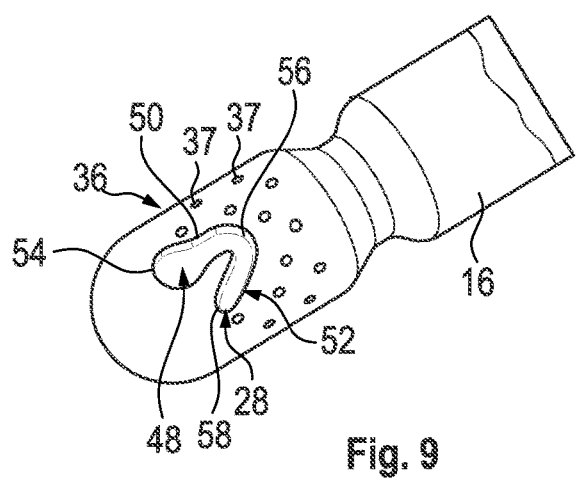
FIG. 9 shows a perspective view of a discharge area of an embodiment of an inflator configured corresponding to a holding element according to FIG. 7.

FIG. 9 shows the discharge area of an inflator 16 corresponding to the holding element 14 of FIGS. 2 to 8. The discharge area 36 has a plurality of discharge openings 37 through which the gas of the inflator 16 can flow out when the latter has been activated.

In the discharge area 36, a positioning element seat 28 is disposed which is configured together with the positioning element 26 in the manner of a bayonet lock. The positioning element seat 28 is in the form of a groove 48 having a first leg 50 and a second leg 52 which are aligned with each other in V-shape, the leg tail of the first leg 50 and the leg head of the second leg 52 forming the tip 56 of the V-shape. The groove 48 is widened at the first leg 50 in the area of the leg head 54 and tapers toward the tip 56 of the V-shape so that the finding and insertion of the positioning element 26 in the form of a bulge is facilitated. In the shown embodiment, the latching position in which the inflator 16 is in the predetermined position in the holding element 14 is determined by the leg tail 58 of the second leg 52.

In particular in a holding element 14 according to the first three embodiments (FIGS. 2 to 6), the positioning element seat 28 can also be configured as an indentation in the form of the resilient dot embossing 61, in particular as a circular or oval indentation (not shown).

FIG. 10 shows a detail view of the diffusor 32 of the holding element 14 comprising a second embodiment of an additional position fixation device 62. The position fixation device 62 serves for generating an axial force upon the inflator to intensify the functionality of the bayonet lock formed of the positioning element 26 and the positioning element seat 28. For this purpose, the position fixation device 62 comprises a spring region 64 by which the inflator 16 is forced into the latching position of the bayonet lock. The position fixation device 62 shown here further comprises a buffer element 66 via which it can be controlled, for example, how far the outer walls 34 of the diffusor 32 of the holding element 14 can bend open, when the inflator 16 has been activated.

Figure 11:
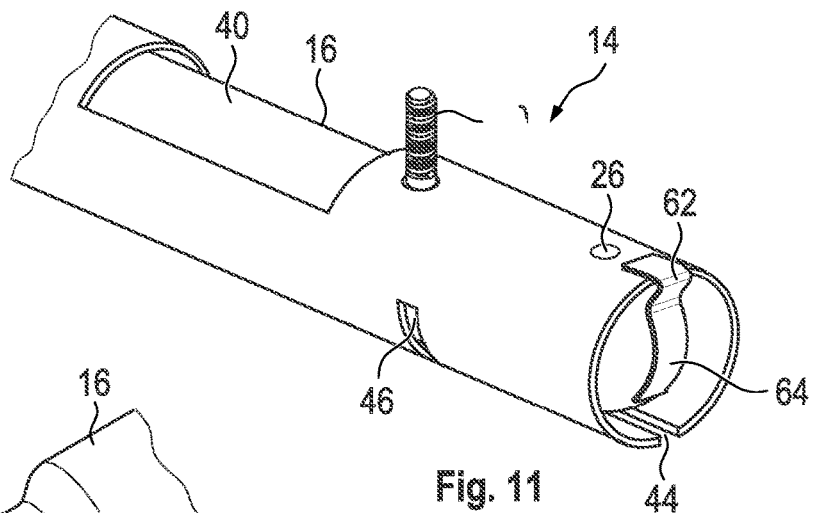
FIG. 11 shows a perspective view of a diffusor of the holding element according to FIG. 7 which comprises a second embodiment of an additional position fixation device.

FIG. 11 also shows a detail view of the diffusor 32 of the holding element 14, wherein a third embodiment of an additional position fixation device 62 is illustrated in FIG. 11. In the embodiment shown in FIG. 11, the position fixation device 62 is disposed on the diffusor 32 in alignment with the positioning element 26 and the securing elements 40. The position fixation device 62 can be arranged, for example, via an adhesive connection. The position fixation device 62 protrudes into the interior of the holding element toward the interruption edge 44, the portion of the position fixation device 62 protruding into the interior of the holding element being in the form of a spring region 64.

Figure 12:
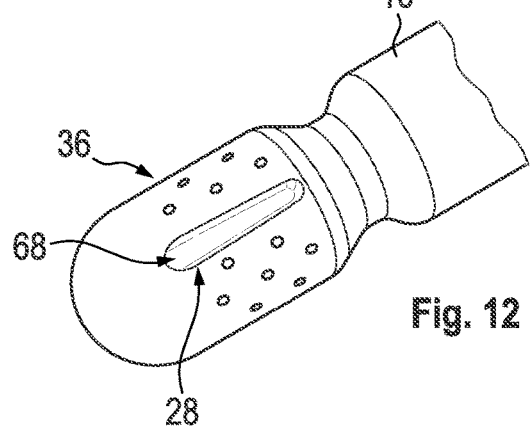
FIG. 12 shows a perspective view of a discharge area of an embodiment of an inflator configured corresponding to a holding element according to FIG. 13.
Figure 13:
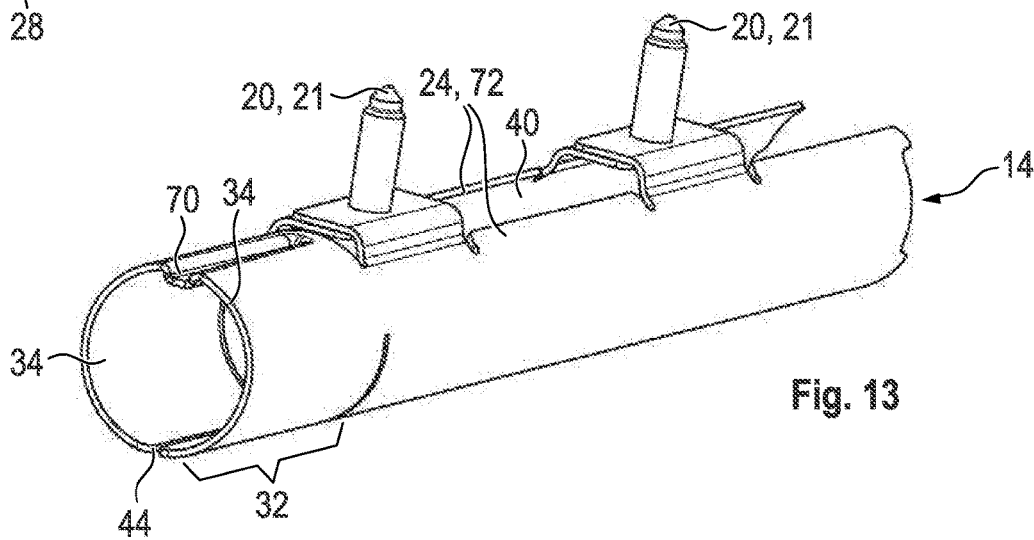
FIG. 13 shows a perspective view of a fifth embodiment of a holding element of an airbag module according to the invention.
Figure 14:
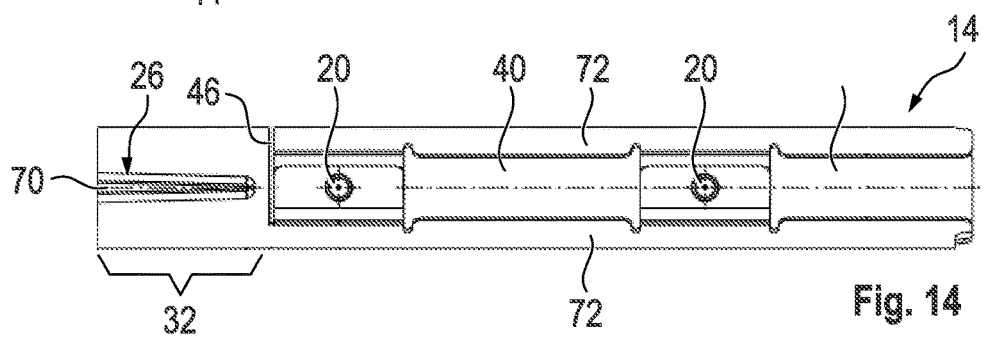
FIG. 14 is a top view onto the holding element according to FIG. 13.

FIG. 12 illustrates the discharge area 36 of an inflator 16 with another alternative embodiment of the positioning element seat 28. In FIGS. 13 and 14, a fifth embodiment of the holding element 14 is shown which has a positioning element 26 corresponding to the positioning element seat 28 of the inflator 16. The fifth embodiment is similar to the afore-described fourth embodiment. For the parts known from the preceding embodiments the same reference symbols are used. In this respect, the foregoing explanations are referred to.

The positioning element 26 of the holding element 14 is a wedge-shaped longitudinal notch 70 and the positioning element seat 28 of the inflator 16 is a wedge-shaped groove 68 corresponding to the wedge-shaped longitudinal notch 70. In the embodiment of FIGS. 13 and 14, the holding element 14 is manufactured as a punched and bent part. The securing bolts 21 can equally be welded to the holding element or can be inserted in dedicated securing element seats not shown here. The holding element 14 may further comprise fixing elements 24 in the form of outer wall segments 72. The outer wall segments can be forced, when the holding element 14 is fastened in the module housing 12 via a fixing element 24 of the module housing 12, for example (see FIG. 1), against the inflator 16 and can thereby (additionally) fix the latter in the holding element 14.

Figure 15:
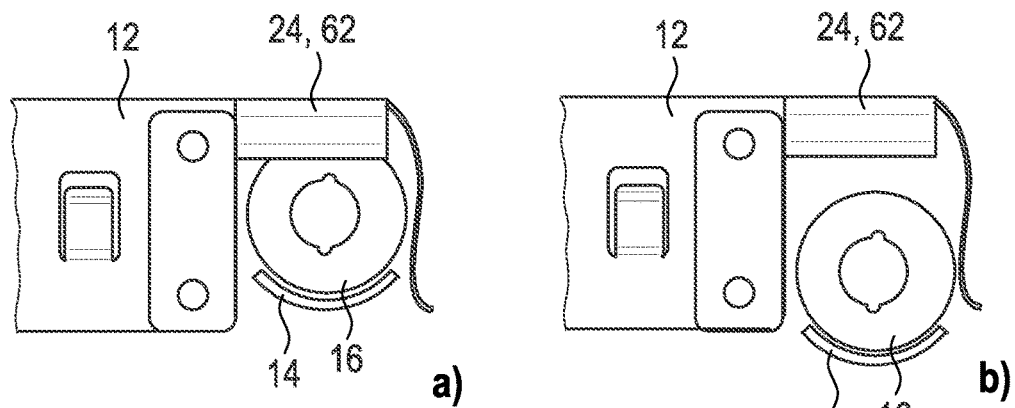
FIG. 15 shows a partial view of an airbag module according to the invention in the area of a plug element of the inflator with a) a fastened holding element and b) a released holding element.

FIG. 15 illustrates a partial view of an airbag module 10 according to the invention with a holding element 14 secured/fastened in FIG. 15 a) and with a holding element 14 released in FIG. 15 b).

The module housing 12 has an (additional) fixing element 24 in the area of the plug element 38 of the inflator 16. In the fastened state of the holding element 14, the additional fixing element 24 moreover acts as a position fixation device 62 which prevents an axial movement of the inflator 16. In addition, in this embodiment removal of the inflator 16 in the fastened position is prevented by the fixing element 24. In order to be able to remove the inflator from the holding element 14, at first the securing elements 20 must be released so that the holding element 14 and the inflator 16 are in the removing position shown in FIG. 15 b).

Figure 16:
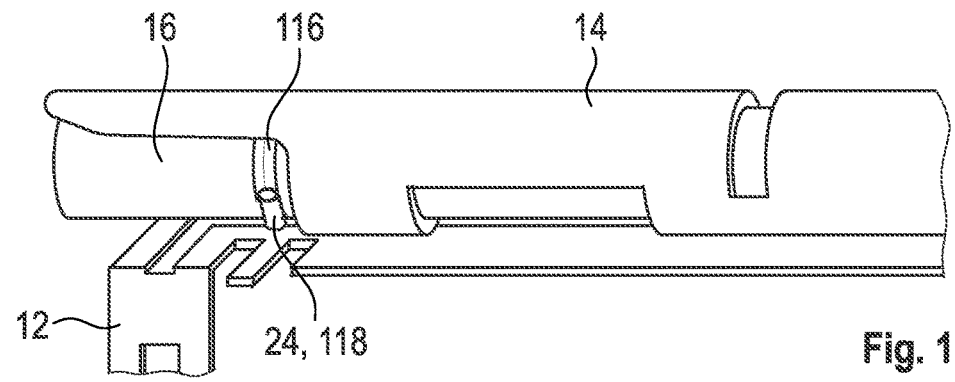
FIG. 16 shows a partial view of an airbag module according to the invention with a sixth embodiment of a holding element and an inserted inflator.

FIG. 16 illustrates another embodiment of a module housing 12 in the form of a module holder 12 for a fabric module housing as well as a sixth embodiment of a holding element 14 with an inserted inflator 16 of an airbag module 10 according to the invention.

Figure 18:
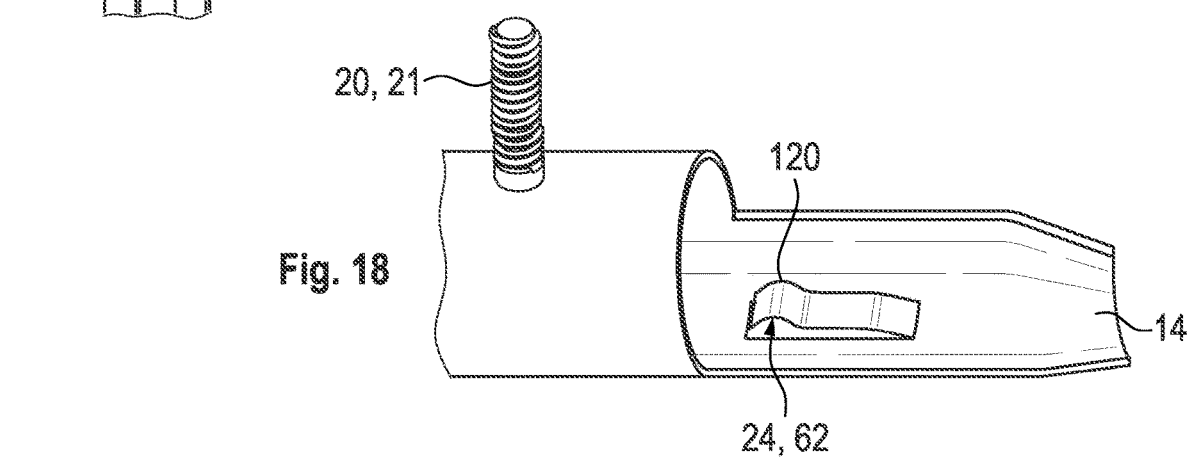
FIG. 18 shows a partial view of an axial end of the holding element according to FIG. 16, FIGS. 19 a) and b) show perspective views of a seventh embodiment of a holding element and of an inflator of an airbag module according to the invention, FIGS. 20 a) to c) show different detail views of axial ends of the holding element according to FIG. 19.

The holding element 14 according to the sixth embodiment comprises a fixing element 24 that is formed integrally with a positioning fixation device 62 as a spring element 120. The spring element 120 comprises a latching area 122 which is suited for engaging in an inflator neck portion 116 of the inflator 16 (see FIG. 18).

Figure 17:
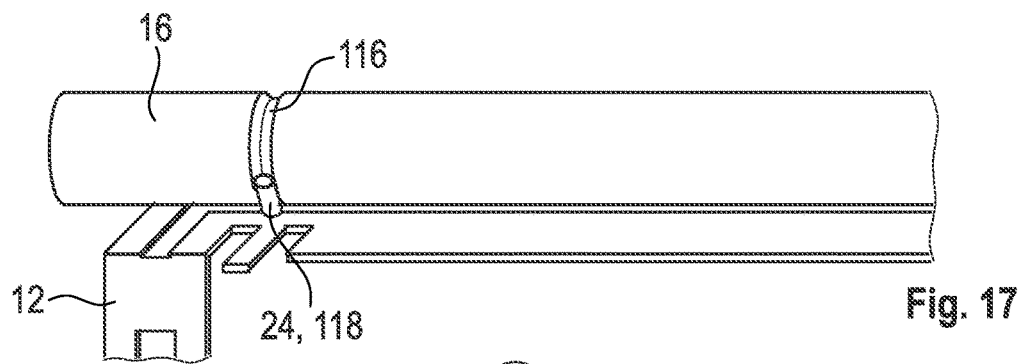
FIG. 17 shows a partial view of the airbag module and the inflator according to FIG. 16 without the holding element.

The module housing 12 also includes a fixing element 24 which in this case is a bent pin element 118 (see also FIG. 17). When fastening the holding element 14 with the inflator 16 to the module housing 12, the pin element 118 engages in the inflator neck portion 116 of the inflator 16, thereby fixing the inflator 16 at least positively in the holding element.

FIGS. 19 a) and b) schematically illustrate the insertion of the inflator 16 into a seventh embodiment of the holding element 14. In the area of the diffusor 32, the holding element 14 comprises an embodiment of a position fixation device 62 which is in the form of a pin-shaped stop, see FIGS. 20 a) and b).

The holding element 14 moreover comprises a positioning element 26 which, in connection with the corresponding positioning element seat 28 of the inflator 16, maintains the inflator 16 at a predetermined position in the holding element 14 and prevents rotation, for example.

Moreover, the holding element 14 comprises a fixing element 24 which, in the fastened state of the holding element 14, prevents an axial movement of the inflator 16. Furthermore, the fixing element 24 of the holding element 14 prevents the inflator 16 from being removed in the fastened state. In order to be able to remove the inflator 16 from the holding element 14, at first the fastening elements 20 must be released.

In the further embodiments shown below, for the parts known from the previously shown embodiment, the same reference symbols are used and merely the differences are discussed in detail. In this respect, the foregoing explanations are referred to.

Figure 21:
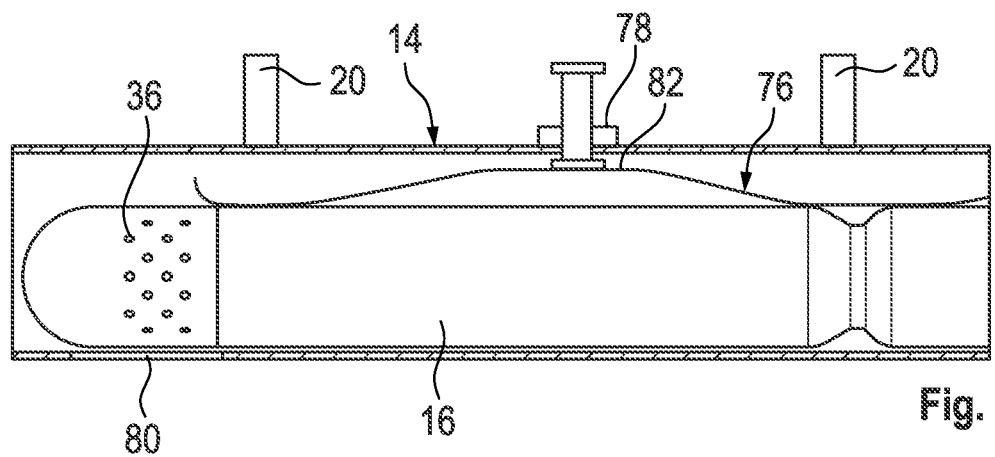
FIG. 21 shows a schematic sectional view across an inflator and an eighth embodiment of a holding element, FIG. 22 a) shows a schematic sectional view across a ninth embodiment of a holding element and b) shows an embodiment of an inflator corresponding to the holding element.

FIG. 21 illustrates an eighth embodiment of the holding element 14 which is manufactured as a tube. The holding element 14 has a diffusor opening 80 in the discharge area 36 of the inflator 16. The fixing element is disposed in the holding element 14 and comprises a spring element 76. The spring element 76 is wave-shaped, with a bracing device 78 acting on the wave crest 82 of the wave-shaped spring element 76. Via the bracing device 78, the spring element 76 can be braced against the inflator 16, thereby fixing the inflator 16 non-positively in the holding element 14. The bracing device 78 comprises a screw element in the embodiment shown here.

Figure 22:
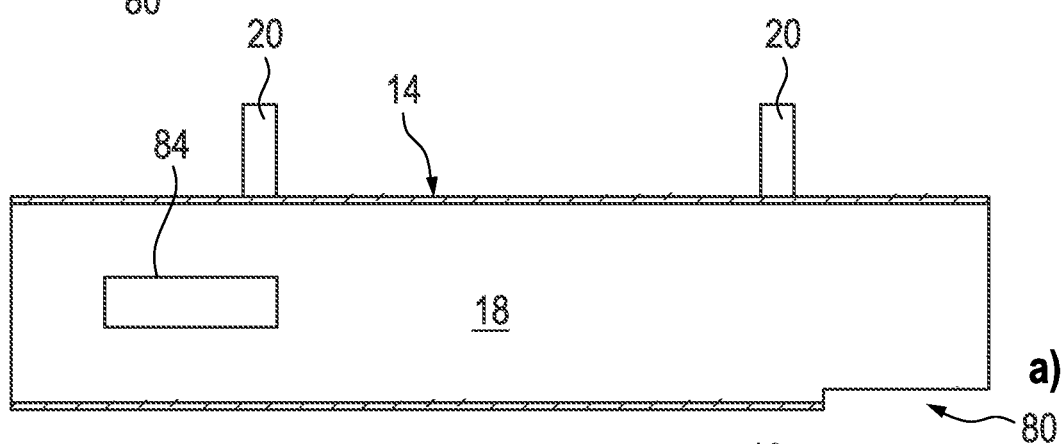

FIGS. 22 a) and b) show a ninth embodiment of the holding element 14 and the inflator 16. The holding element 14 includes a diffusor opening 80 in the discharge area 36 of the inflator 16. The fixing element 24 in this embodiment is a latching seat 84. The latching seat 84 is a seat for a latching element 86 disposed on the inflator 16. In the embodiment shown here, each of the holding element 14 and the inflator 16 includes two latching seats 84 and two latching elements 86. The latching element 86 is a spring system including spring elements 88 so that the inflator 16 can be released from the fixation in the holding element 14 by compressing the spring elements 88. The inflator 16 is further fixed in the holding element 14 by the latching element 86 and the latching element seat 64 at a predetermined position.

Figure 23:
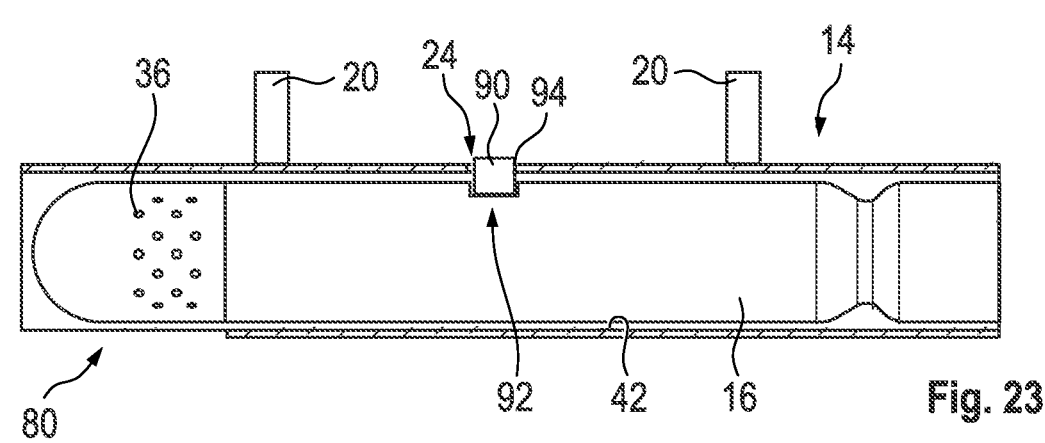
FIG. 23 shows a schematic sectional view across an inflator and a tenth embodiment of a holding element, FIGS. 24 a) and b) show a schematic sectional view across an inflator and an eleventh embodiment of a holding element, and FIG. 25 *a*) shows a schematic sectional view across an inflator and a twelfth embodiment of a holding element and *b*) shows a view of an axial end of the inflator and the holding element.

FIG. 23 illustrates a tenth embodiment of the holding element 14 as well as of a corresponding inflator 16. The fixing element 24 disposed in the holding element 14 comprises a fixing bolt 90 disposed in a fixing element seat 94. In order to fix the inflator 16 at a predetermined position in the holding element 14, the inflator 16 in the shown embodiment further comprises a fixing bolt seat 92. In another embodiment not shown, the inflator can also be designed without such fixing bolt seat 92 and, for being fixed in the holding element 14, can only be forced against the inner wall 42 of the holding element by the fixing bolt 92.

Figure 24:
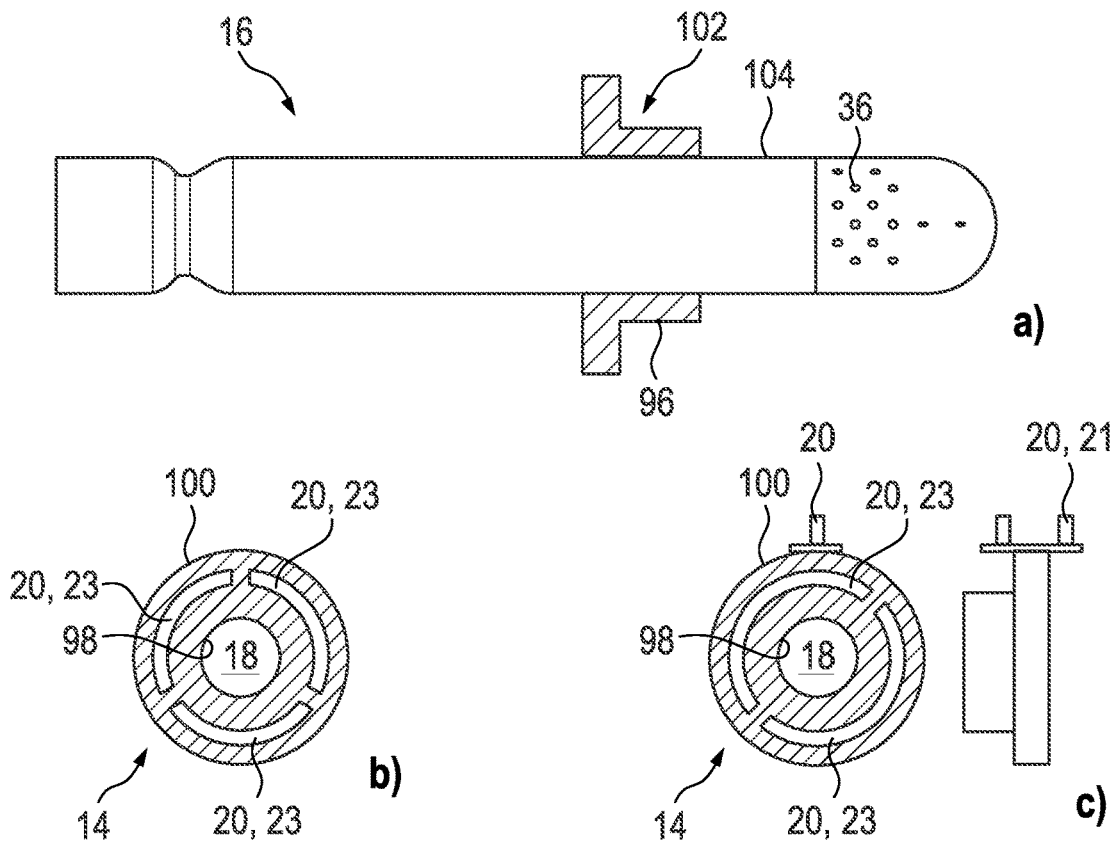

FIGS. 24 a) to c) illustrate an eleventh embodiment of the holding element 14 and of a corresponding inflator 16. The holding element 14 is configured as an airbag nut 100 in the embodiments of FIGS. 24 b) and c). The airbag nut 100 can be sewn into the airbag via the securing elements in the form of airbag seats 23 in the area of the inflation mouth. In addition, the airbag seats 23 can be provided to be further used for securing the holding element 14 in the form of the airbag nut 100 to the module housing 12, see FIG. 24 b). Alternatively, additional securing elements 20, such as securing bolts 21, for securing the holding element 14 and the airbag to the module housing 12 can be provided on the airbag nut 100, see FIG. 24 *c*). The holding element 14 in the form of the airbag nut 100 comprises a female thread 98 as fixing element 24. As an alternative to the airbag nut 100, the holding element 14 can be a cage-like tube into which a female thread 98 is introduced to the inner wall (not shown).

The inflator 16 comprises a male thread 96 corresponding to the female thread 98 which allows to screw the inflator 16 into the holding element 14. The male thread 96 can be disposed directly in an outer cover 104 of the inflator 16 (not shown) or on a generator nut 102 disposed on the inflator 16. The generator nut 102 including the male thread 96 can be secured, for example by an adhesive connection such as by welding, to the outer cover 104 of the inflator 16.

Figure 25:
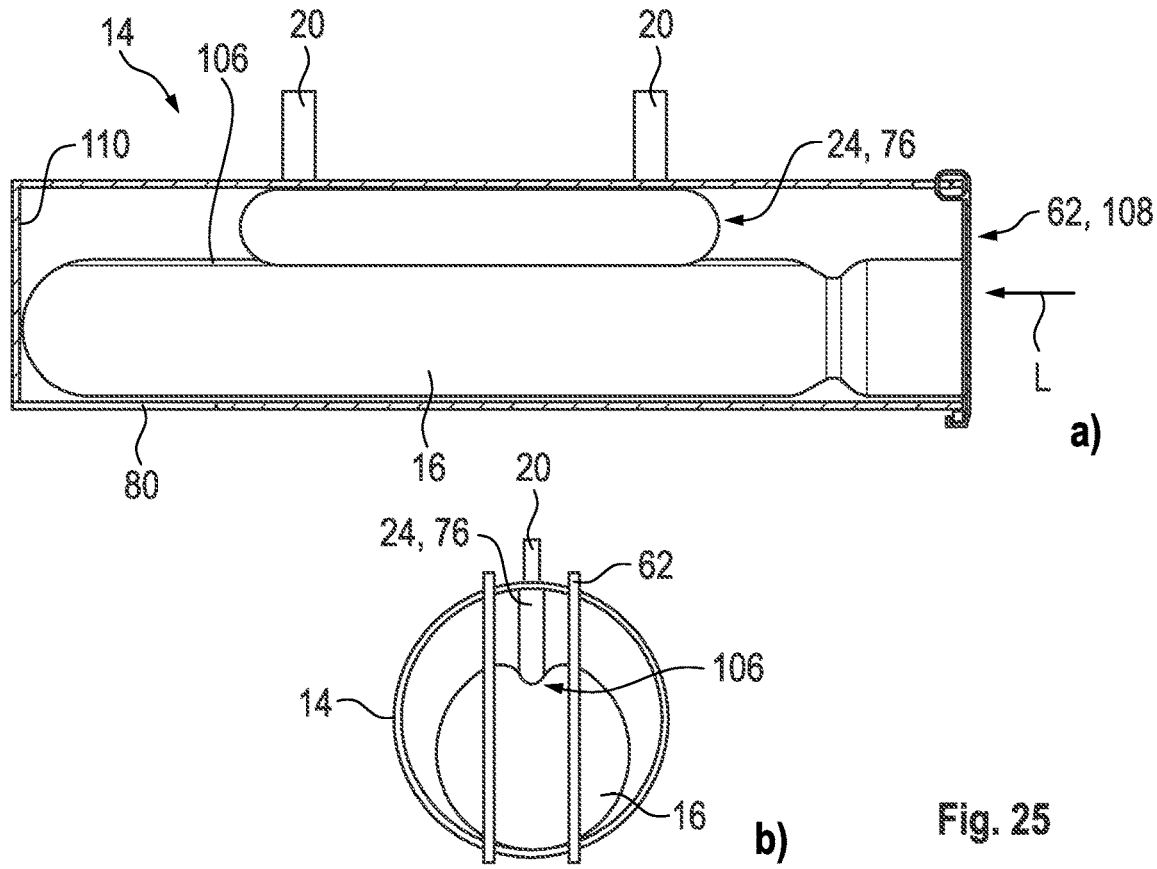

FIGS. 25 *a*) and *b*) illustrate a twelfth embodiment of a holding element 14 and a corresponding inflator 16. The fixing element 24 is in the form of a spring element 76. The inflator 16 can comprise, as shown in FIG. 16, a receiving nut 106 for receiving the spring element 76 by which receiving nut 106 the inflator 16 can be fixed at a predetermined position in the holding element 14. The holding element 14 further comprises a positioning fixation device 62 which is a clamping bracket 108 in this case and forces the inflator 16 in the longitudinal direction axially against the end face 110 of the holding element 14.

The invention claimed is:

1. An airbag module, comprising:
 a module housing;
 an airbag positioned in the module housing in a folded condition;
 a holding element positioned in the airbag while in the folded condition in the module housing;
 an inflator positioned in the holding element within the airbag and being configured to deliver inflation fluid into the airbag through the holding element; and
 a fixing element configured to releasably retain the inflator in the holding element;
 wherein the holding element at least partially encloses the inflator along its length so that the holding element is configured to function as a placeholder that allows the inflator to be completely removed from the holding element and the airbag without disturbing the airbag and to be re-installed in the holding element and airbag without requiring manipulation of the airbag;
 wherein the holding element comprises one or more securing elements having a tightened state and a loosened state, wherein the one or more securing elements when in the tightened state are configured to directly secure the holding element and the airbag to the module housing,
 wherein the holding element is configured so that the one or more securing elements when in the tightened state urge the holding element and the inflator toward the module housing so that the inflator is secured in the module housing, holding element, and airbag, and the fixing element is blocked from releasing the inflator for removal from the module housing, holding element, and airbag;
 wherein the holding element is further configured so that the one or more securing elements in the loosened state release the holding element and the inflator being urged toward the module housing so that the fixing element releases the inflator from being secured in the module housing, holding element, and airbag so that the inflator can be removed from the module hosing, holding element, and airbag while the securing elements maintain a connection of the holding element and airbag to the module housing.

2. The airbag module according to claim 1, wherein the holding element comprises a positioning element, and the inflator comprises a positioning element seat, or the inflator comprises a positioning element and the holding element comprises a positioning element seat.

3. The airbag module according to claim 2 wherein the holding element includes at least two positioning element seats so that the holding element is suited for receiving inflators of different overall size.

4. The airbag module according to claim 2 wherein the positioning element is formed in the holding element as a resilient dot embossing.

5. The airbag module according to claim 2, wherein the positioning element and the positioning element seat are configured as a bayonet lock.

6. The airbag module according to claim 2, wherein the positioning element is configured as a wedge-shaped longitudinal notch and the positioning element seat is configured as a wedge-shaped groove corresponding to the wedge-shaped longitudinal notch.

7. The airbag module according to claim 1, wherein the fixing element is configured as a recess directed into a housing interior of the module housing or is configured as a pin element disposed in the housing interior of the module housing.

8. The airbag module according to claim 1, wherein the fixing element is formed integrally with a positioning fixation device as a spring element.

9. The airbag module according to claim 1, wherein the holding element comprises a diffusor for the inflator which includes an outer wall enclosing the inflator at least partly in a discharge area in a circumferential direction, the outer wall of the diffusor having an interruption edge substantially extending in the longitudinal direction and, when the inflator is activated, is bent open along said interruption edge and defines an outflow direction for the gas.

10. The airbag module according to claim 1, wherein the inflator comprises a removing aid.

11. The airbag module according to claim 1, wherein the holding element comprises at least one anti-bending device in a region of the diffusor.

12. The airbag module according to claim 1, wherein the fixing element comprises a spring element, the spring element being operatively connected to a bracing device.

13. The airbag module according to claim 1, wherein the fixing element is configured as a latching seat disposed in the holding element for receiving a latching element disposed on the inflator.

14. The airbag module according to claim 1, wherein the holding element comprises a female thread as the fixing element which corresponds to a male thread arranged on the inflator.

15. The airbag module according to claim 14, wherein the holding element is configured as a tube having a female thread or as an airbag nut that is sewn into the airbag in an area of an inflation mouth of the airbag, and the male thread is secured to a generator nut secured to the inflator.

16. The airbag module according to claim 1, wherein the fixing element comprises a fixing bolt which engages in a fixing bolt seat disposed on or in the inflator.

17. The airbag module according to claim 1, wherein the airbag module is a knee airbag module and the airbag is a knee airbag.

18. A method for replacing an inflator of an airbag module according to claim 1, comprising the steps of:
 loosening at least one of the one or more securing elements and the fixing element, wherein loosening the one or more securing elements releases relieves a connection of the holding element and airbag from the module housing of the airbag module, and releases a fixation of the inflator in the holding element produced via the one or more securing elements, and wherein loosening the fixing element releases the fixation of the inflator in the holding element, removing the old inflator from the holding element, inserting a new inflator into the holding element, fastening the securing elements to secure the holding element and the airbag to the module housing and to secure the new inflator in the holding element, or fixing the fixing element to fix the new inflator in the holding element.

19. The method according to claim 18, wherein, when fastening the securing elements, the new inflator is braced in the holding element by a fixing element disposed on the module housing or integrated in the module housing.

20. The method according to claim 18, wherein the inflator is fixed in the holding element by a fixing element disposed on or in the holding element or corresponding to the holding element, wherein fixation can be effectuated in a separate method step or by interaction when fastening the securing elements.

21. A method for manufacturing the airbag module according to claim 1, the method comprising the steps of:

inserting the holding element into the folded airbag in a folded condition to create an airbag package or inserting the holding element into the airbag in an unfolded condition and subsequently folding the airbag to create the airbag package, thermosetting the airbag package at a temperature which is above a safety ignition temperature of more than 90° C., inserting the thermoset airbag package into the module housing, and inserting and fastening the inflator in the holding element.

22. The method according to claim 21, wherein the inflator is a tubular inflator.

* * * * *